United States Patent [19]

Yamamoto et al.

[11] Patent Number: 5,313,321
[45] Date of Patent: * May 17, 1994

[54] OPTICALLY SWITCHING FERROELECTRIC LIQUID CRYSTAL LIGHT VALVE HAVING A PRE-TILT ANGLE OF 60 TO 80 DEGREES

[75] Inventors: Shuhei Yamamoto; Naoki Kato, both of Tokyo, Japan

[73] Assignee: Seiko Instruments Inc., Japan

[*] Notice: The portion of the term of this patent subsequent to Feb. 4, 2009 has been disclaimed.

[21] Appl. No.: 794,139

[22] Filed: Nov. 15, 1991

Related U.S. Application Data

[63] Continuation of Ser. No. 328,118, Mar. 23, 1989, Pat. No. 5,085,498.

[30] Foreign Application Priority Data

Mar. 23, 1988 [JP] Japan .................................. 63-68967
Mar. 23, 1988 [JP] Japan .................................. 63-68970
Sep. 28, 1988 [JP] Japan .................................. 63-242999

[51] Int. Cl.$^5$ .................................. G02F 1/133
[52] U.S. Cl. .................................. 359/77; 359/70; 359/72; 359/75; 359/84
[58] Field of Search .................. 359/70, 72, 75, 76, 359/84, 49, 77

[56] References Cited

U.S. PATENT DOCUMENTS

| | | | |
|---|---|---|---|
| 3,824,002 | 7/1974 | Beard .................................. | 359/72 |
| 4,533,215 | 8/1985 | Trias et al. ........................... | 359/70 |
| 4,672,014 | 6/1987 | Joiner et al. ......................... | 359/72 |
| 4,699,498 | 10/1987 | Naemura et al. .................... | 359/49 |
| 4,714,323 | 12/1987 | Katagiri et al. ...................... | 359/75 |
| 4,826,293 | 5/1989 | Grinberg et al. ..................... | 359/70 |
| 4,925,276 | 5/1990 | McMurray, Jr. et al. ............. | 359/72 |
| 5,085,498 | 2/1992 | Yamamoto et al. .................. | 359/70 |

Primary Examiner—William L. Sikes
Assistant Examiner—Huy K. Mai
Attorney, Agent, or Firm—Bruce L. Adams; Van C. Wilks

[57] ABSTRACT

A liquid crystal light valve cell has two optically different states switchable therebetween by bias voltage in response to incident light. A ferroelectric liquid crystal layer is sandwiched by a pair of front and rear alignment layers to establish the two bistable states in the ferroelectric liquid crystal layer. A front electrode layer is disposed on the front alignment layer. An optically reflecting layer is disposed on the rear alignment layer. A photo-conductive layer is disposed on the reflecting layer and responsive to the incident light incident from the rear face of cell to increase its electroconductivity. A rear electrode layer is disposed on the photo-conductive layer in cooperation with the front electrode layer to apply the bias voltage between the multi-layer structure including the liquid crystal layer and the photo-conductive layer such that effective bias voltage is applied across the liquid crystal layer through the increased electroconductive region of photo-conductive layer to thereby effect the switching between the two bistable states. The multi-layer structure is sandwiched by a pair of front and rear transparent substrates to construct the liquid crystal light valve cell.

8 Claims, 6 Drawing Sheets

OPTICALLY SWITCHING FERROELECTRIC LIQUID CRYSTAL LIGHT VALVE HAVING A PRE-TILT ANGLE OF 60 TO 80 DEGREES

This is a continuation of application Ser. No. 328,118 filed Mar. 23, 1989 now U.S. Pat. No. 5,085,498.

BACKGROUND OF THE INVENTION

The present invention relates to liquid crystal light valves which are activated optically to effect switching between an optical ON state and an optical OFF state, and which are utilized for the intermediate recording medium of an optical printer, graphic display device, light shutter, image processing device, optical information processing system and so on.

There are known optically switching liquid crystal light valves of the various types which may be classified in terms of optical switching mode and liquid crystal mode. The known optical switching modes include an opto-electric conversion mode of irradiating light onto photo-conductive film, through which liquid crystal film is indirectly electrically biased, to optically change the electroconductivity of photo-conductive film to thereby electrically activate the liquid crystal film, and another opto-thermal conversion mode of scanning a laser beam along liquid crystal film to thermally change the optical state of liquid crystal film. The known optical liquid crystal modes of switching between ON and OFF states include phase transition mode of smectic A (SmA) liquid crystal, phase transition mode between nematic (Ne) liquid crystal phase and cholesteric (Ch) liquid crystal phase, dynamic scattering mode (DSM) of liquid crystal, twist nematic (TN) mode, super twist nematic (STN) mode and so on.

The opto-electro conversion mode is superior to the thermal conversion mode in view of switching speed and therefore is expected for application of displaying a moving image. However, in the known opto-electro conversion mode, the liquid crystal film maintains its activated state only during the irradiation of light thereonto. After stopping the irradiation of light, the activated or ON state of liquid crystal can be momentarily held due to the CR time constant of liquid crystal film and thereafter immediately returns to the non-activated or OFF state.

In the case of using twist nematic liquid crystal film having a normal twist angle of 90° in the opto-electric conversion mode light valve, a cathode ray tube (CRT) is utilized as an irradiating light source so as to use its afterglow for maintaining the activated state. However, in such case, the resolution of the light valve is determined substantially by that of the CRT. Therefore, there are various drawbacks such as large dimension and high cost which are needed to improve the resolution of CRT.

On the other hand, there has been proposed another light irradiation source of a scanned laser beam. In this case, however, since the twist nematic liquid crystal holds its ON state only for a moment, it is difficult to improve the resolution of the light valve. In order to obtain the large scale image display of high resolution with such type of light valve, it would be necessary to repeatedly scan the laser beam along the identical path at high speed to thereby necessitate an ultra high speed laser beam scanner with ultra high resolution and ultra-high-sensitive photo-conductive film, and there would be many technical problems to be solved.

SUMMARY OF THE INVENTION

In view of the drawbacks of known photo-electro conversion mode liquid crystal light valve, an object of the present invention is to provide an improved liquid light valve having an electrically biased double layer structure composed of a photo-conductive film which can locally increase its electro-conductivity upon irradiation of incident light to change bias voltage, and a ferroelectric liquid crystal film having a memory characteristic effective to maintain its optically bistable (ON and OFF) state established due to change of the bias voltage even after stopping of the incident light irradiation.

Another object of the present invention is to establish the bistable state of ferroelectric liquid crystal composed, for example, of a mixture of ester type smectic C (SmC) phase liquid crystal composition and added optically active substance by using an alignment layer formed by, for example, oblique evaporation of silicon monooxide.

A further object of the present invention is to form a photo-conductive film from, for example, hydrogenated amorphous silicon (a-Si:H) which is thermally stable against heat generated during the production of a liquid crystal light valve under more or less 200° C., and which exhibits great electric conductivity in response to light irradiation and great electric resistivity under optically dark conditions.

According to the present invention, molecules of the ferroelectric liquid crystal are aligned uniformly in a direction substantially along the film of liquid crystal with a proper pre-tilt angle between the axis or director of the molecules and the plane of film according to binding force of the alignment layer in contact with the liquid crystal film. Further, this binding force due to interaction at the boundary between the alignment layer and the liquid crystal film is relatively weak so that the bound molecules can angularly move or switch between the two states upon application of opposite polarity voltages across the liquid crystal film to thereby maximize the angular distance or cone angle between the two states to increase the optical contrast between the bistable states.

The double structure of photo-conductive film and liquid crystal film has different threshold voltage valves effective to switch between the bistable states. A first threshold voltage under the bright condition is smaller than a second threshold voltage under the dark condition, because a net or effective voltage applied across the liquid crystal film under the bright condition is smaller than that under the dark condition due to the increase of electroconductivity of photo-conductive film in response to the irradiation of incident light.

In operation, the light valve is firstly preset to one of the bistable states. The presetting is carried out by either of applying a DC voltage with or without superposed AC voltage of 1 KHz to 50 KHz, sufficiently greater than the first threshold voltage valve, to the light valve under the irradiation of light over the entire face of the light valve to set the molecules of ferroelectric liquid crystal into one of the bistable states to thereby hold or memorize that state, or applying another DC voltage sufficiently greater than the second threshold voltage valve to the light valve under the dark condition to set the molecules into one of the bistable states to thereby hold or memorize that state.

After the presetting operation, the double layer structure is applied with a bias DC voltage with or without superposed AC voltage of 1 KHz to 50 KHz, having the opposite polarity to the presetting DC voltage and a magnitude greater than the first threshold voltage valve and smaller than the second threshold voltage valve, while the double structure is irradiated selectively or locally with, for example, a scanned laser beam. By such operation, the photo-electric film produces a carrier in the region along the path of the laser beam such that the carrier is drifted in a direction parallel to the bias DC voltage so as to reduce the resistivity in the irradiated region to thereby apply a net or effective opposite voltage across a portion of the liquid crystal film corresponding to the irradiated region. The net or effective opposite voltage is effective to reverse the preset state to the other state due to the angular movement of ferroelectric liquid crystal molecules caused by the reverse rotation of spontaneous polarization thereof.

After writing the other or activated state into the background of the preset state to form, for example, an image on the light valve, the light valve may be irradiated with reading light linearly polarized in a direction parallel (or parpendicular) to the C director of molecules held in the other state, and the reflected reading light reflected by a reflecting layer disposed at the back of light valve is analyzed by an analyzer having a polarization axis perpendicular (or parallel) to the polarization direction of reflected reading light to thereby project the image on a screen.

In addition, after writing the image on the light valve, the light valve may be applied with an erasing DC voltage having a polarity opposite to the bias or writing voltage and a magnitude smaller than the second threshold valve and greater than the first threshold valve, while irradiating locally and partly the light valve to thereby partly erase the written image.

DETAILED DESCRIPTION OF THE INVENTION

Figure 1:
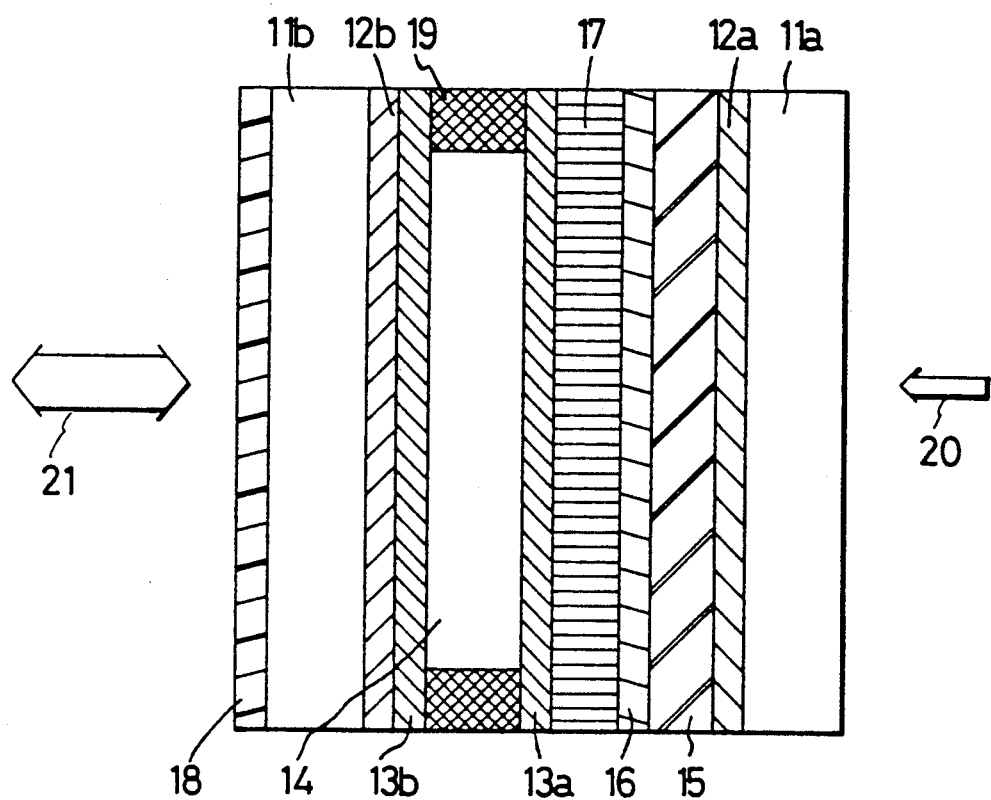
FIG. 1 is a schematic cross sectional view of the optically switching ferroelectric liquid crystal light valve according to the present invention.

Hereinafter, the present invention will be described in detail in conjunction with the attached drawings. FIG. 1 shows a structural sectional view of the ferroelectric liquid crystal light valve according to the present invention. The inventive light valve is characterized in that the ferroelectric liquid crystal is utilized to establish two different stable states having different optical transmitivities or reflectivities and being switchable between each other according to polarities of bias voltage in the light valve.

A pair of rear and front transparent substrates 11a and 11b are made of glass or plastic and are connected to each other by means of a spacer 19 to form a light valve cell for accommodating therein a liquid crystal layer 14 composed of ferroelectric liquid crystal molecules. The front substrate 11b is formed on its inner face sequentially with a transparent electrode layer 12b and an alignment layer 13b. The alignment layer 13b is formed by oblique evaporation of silicon monooxide in the angular direction of 75 to 85 degrees relative to the normal of substrate 11b. The rear substrate 11a is also formed on its inner face with another transparent electrode layer 12a and another alignment layer 13a which is formed in a manner similar to the alignment layer 13b. The pair of substrates 11a and 11b are opposed in controlled space relation to each other such that the pair of alignment layers 13a and 13b are disposed in contact with the interposed liquid crystal layer 14 at opposite side thereof.

Further, a photo-conductive layer 15, a light shielding layer 16 and a dielectric mirror layer 17 are sequentially interposed between the transparent electrode layer 12a and the alignment layer 13a in multi-layer structure on the inner face of rear substrate 11a. On the other hand, the front substrate 11b is formed on its outer face with a non-reflective coating layer 18.

According to such structure of the light valve which includes the double layer structure of photo-conductive layer 15 and ferroelectric liquid crystal layer 14, a switching or writing light 20 is irradiated onto the double layer structure from the outer or rear face of transparent substrate 11a to effect switching between the two optically different stable ON and OFF states to thereby write an image pattern into the ferroelectric liquid crystal layer 14, and a reading or projecting light 21 is irradiated onto the light valve from the outer face of front transparent substrate 11b to read out or project the image pattern written in the liquid crystal layer 14.

In making the inventive light valve of FIG. 1, a pair of transparent glass substrates 11a and 11b are provided, and transparent electrode layeres 12a and 12b are deposited on each face of respective substrates 11a and 11b in the form of ITO transparent electroconductive film over the entire face of respective substrates. The rear substrate 11a is placed within gas composed mainly of SiF$_4$. By decomposing SiF$_4$ with electric spark, intrinsic a-Si:H is deposited on the electrode layer 12a at a thickness of 3 μm to constitute a photo-conductive layer 15. A light shielding layer 16 is formed on the photo-conductive layer 15 which functions to block the reading light from entering into the photo-conductive 15, and thereafter, silicon layer and silicon dioxide layers are alternately deposited in superposed structure of fifteen layers to form a dielectric mirror layer 17. If the dielectric mirror layer 17 has a sufficient reflectivity for incident visible light to avoid the affect of reading light to the photo-conductive layer 15, the light shielding layer 16 can be eliminated.

Silicon monooxide (SiO) is obliquely evaporated onto the dielectric mirror layer 17 from an angular direction of 82 degrees from the normal of the substrate at a thickness of 2000 Å which is measured by a film thickness gauge set along the evaporation direction to thereby form an alignment layer 13a. In similar manner, the front substrate 11b is also subjected to the oblique evaporation of SiO to form another alignment layer 13b on the transparent electrode 12b.

The pair of substrates 11a and 11b are coupled to each other with facing the respective alignment layers 13a and 13b to each other by means of a spacer 19 composed of adhesive containing a chip of glass fiber having a diameter of about 1.5 μm effective to control the spacing between the pair of substrates.

A ferroelectric liquid crystal composition is introduced into the spacing to form a ferroelectric liquid crystal layer 14. The ferroelectric liquid crystal composition may be composed of a mixture of ester type SmC liquid crystal materials added with optically active material. For example, the mixture is comprised of 4-((4'-octyl) phenyl) benzoic acid (3''-fluoro, 4''-octyloxy) phenyl ester:

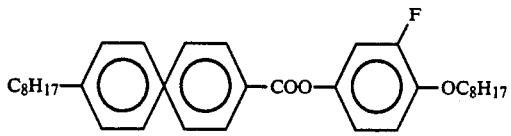

and 4-((4'-octyloxy) phenyl) benzoic acid (3''fluoro, 4''-octyloxy) phenyl ester:

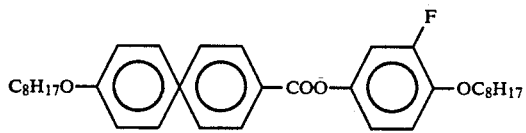

at the ratio of 1:1. The optically active material may be composed of 5-octyloxynaphthalene carboxylic acid 1'-cyanoethyl ester:

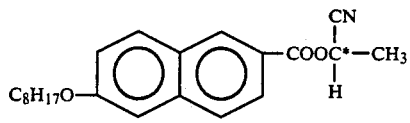

which is added to the mixture by weight of 25% to form the ferroelectric liquid crystal composition.

Figure 2:
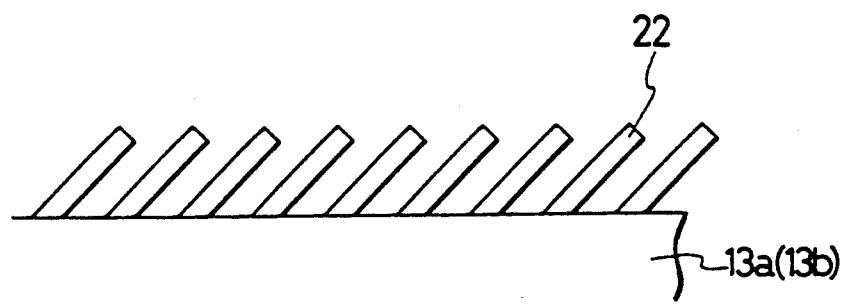
FIG. 2 is an enlarged sectional view of an alignment layer used in the inventive light valve.

FIG. 2 shows an enlarged sectional structure of the alignment layer 13a or 13b produced by the oblique evaporation of silicon monooxide. The alignment layer has a column structure comprised of tiny columns inclined correspondingly to the oblique evaporation angle. The column structure is effective to align the liquid crystal molecules to establish two optically different stable states. In such alignment, the director of the ferroelectric liquid crystal molecules is uniformly controlled to set in one of a the bistable states, and upon application of switching voltage, the director of molecules is angularly moved to the other bistable state through a great angular distance or cone angle, and moreover such angular movement can occur in the molecules positioned at the boundary of the alignment layer to thereby establish highly bistable states with remarkable contrast therebetween due to the great cone angle. When the angle of oblique evaporation is below 75 degrees or above 85 degrees, such effective alignment could not be obtained. Since the polar interaction is small between the silicon monooxide of alignment layer and the molecules of ester type ferroelectric liquid crystal at the boundary therebetween in the above described molecular alignment system, the molecules which have spontaneous dipole moment are not strongly bound by the polar interaction at the boundary, and are uniformly pre-tilted with respect to the alignment layer due to the inclined column structure of alignment layer to thereby enable the switching between the stable states. Such inclined column structure shown in FIG. 2 is produced only when the oblique evaporation of silicon monooxide is carried out at a suitable evaporation angle between 75 to 85 degrees.

When the angle of oblique evaporation is below 75 degrees relative to the normal of substrate, a groove structure is formed instead of the inclined column structure. The liquid crystal molecules are aligned and held along the groove structure, hence the molecules can not be pre-tilted. Moreover, since the molecules are strongly bound in the groove structure at the boundary, one of the two stable states has lower potential energy than that of the other stable state, and therefore it is difficult to establish potentially equivalent bistable state.

When the angle of oblique evaporation is above 85 degrees, which means the evaporated particles enter into the surface of the substrate almost in parallel thereto, an irregular uneven micro structure is formed instead of the inclined column structure. The uneven structure can not produce pre-tilted alignment of the molecules and therefore can not establish effective bistable states in the ferroelectric liquid crystal layer.

Figure 3:
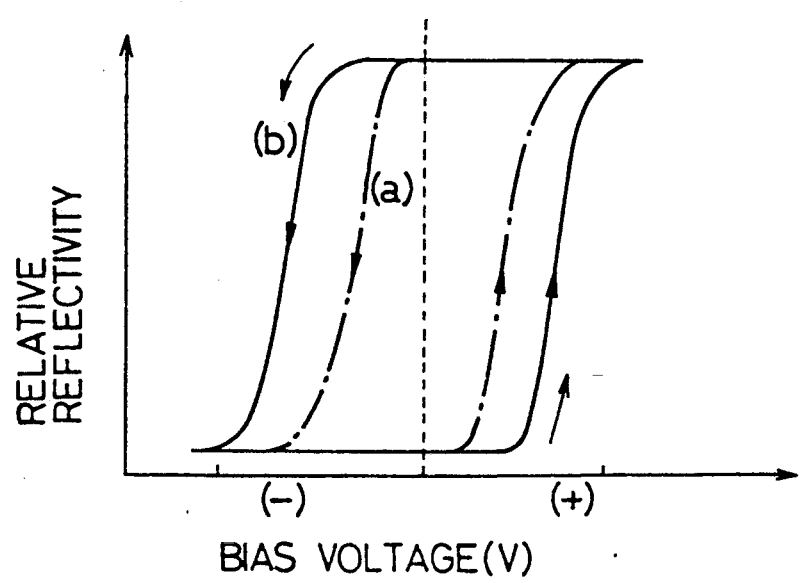
FIG. 3 is a diagram showing the relation between the bias voltage and optical transmitivity of the inventive light valve.

FIG. 3 shows the change of relative optical contrast in terms of relative reflectivity of the light valve shown in FIG. 1 when applying different varying bias voltages between the pair of electrode layers under the bright condition with irradiation of writing light. Under the bright condition, the photo-conductive layer is made in a conductive state (low resistive state) throughout the layer so that the bias voltage is applied to the ferroelectric liquid crystal layer without substantial voltage loss or drop. In the figure, curve (a) shows the change of contrast when applied with a triangle waveform voltage having a peak-to-peak voltage of ±10 V and frequency of 0.1 Hz. As shown, the inventive light valve exhibits an excellent bistability and has clear threshold valve. In the same figure, a curve (b) shows the change of relative contrast when applied with the triangle waveform voltage having a peak-to-peak voltage of ±10 V and frequency of 0.1 Hz, superposed with an AC rectangular waveform voltage having a peak-to-peak voltage of 12 V and frequency of 3 KHz. As understood by the comparison between the curves (a) and (b), a more remarkable hysteresis characteristic can be obtained by superposing an AC voltage to a basic DC voltage.

The light value has a first threshold voltage valve under the bright condition, and a second threshold voltage value under the dark condition, which is greater than the first threshold voltage value due to the high resistivity of photo-conductive layer under the dark condition, effective to drop the net bias voltage applied across the liquid crystal layer. Further, in order to switch between the two stable states either in the dark and bright conditions, a bias voltage of opposite polarities and exceeding the threshold voltage value must be applied to the light valve to reverse the spontaneous dipole of each molecule which is in parallel to the bias voltage field to thereby angularly displace each molecule between the two stable states.

In operation of the inventive light valve to carry out the writing of an image thereonto by means of a light source such as LD and LED, firstly the light valve is preset to one of the two stable states. The presetting can be carried out by either of applying a DC voltage exceeding the first threshold voltage value to the light valve under the bright condition with irradiating incident light over the entire surface of the photo-conductive layer, or applying a presetting DC voltage exceeding the second threshold voltage value to the light valve under the dark condition so as to set all of the ferroelectric liquid crystal molecules in one of the stable states to memorize and hold this state.

Next, in writing a given image onto the light valve, a writing or bias DC voltage having polarity opposite to that of the presetting DC voltage and magnitude greater than the first threshold value of bright condition and smaller than the second threshold value of dark condition is applied to the pair of electrode layers, while the laser beam is selectively irradiated over the rear side of light valve to optically write the given image into the ferroelectric liquid crystal layer. In this case, since the photo-conductive layer has sufficient sensitivity to light wavelength of 700 to 800 nm, a laser beam which has a central wavelength of 700 nm, and which is produced by a semiconductor laser device can effectively generate a carrier in the irradiated region of the photo-conductive layer to reduce the electric resistivity of the photo-conductive layer. Therefore, the writing bias DC voltage is almost directly applied to portion of the liquid crystal layer corresponding to the irradiated region to thereby activate the liquid crystal molecules. On the other hand, the writing bias DC voltage is almost not applied to the remaining portion of liquid crystal layer corresponding to the non-irradiated region of photo-conductive layer because the non-irradiated region maintains its high resistivity so that the liquid crystal molecules in this remaining portion can not be activated and therefore maintain its preset state. As a result, the image is written and memorized in the liquid crystal layer in the form of a pattern defined by the arrangement of the locally activated state over the preset state.

In reading the thus written image, a reading or projecting light linearly polarized through a polarizer is irradiated onto the front face of the light valve, and the reading light reflected by the dielectric mirror layer is introduced through an analyzer onto a screen to project and reproduce the image. The contrast ratio of up to 400:1 can be obtained between the two stable states by using a polarizer and analyzer having 99.9% of polarization degree and 38% of light transmitivity for each.

The conventional light valves of the liquid crystal mode such as TN mode and DSM mode operated in the optical-electric conversion mode do not have the bistability or memory feature, and the liquid crystal molecules are driven by directly applied voltage to change the reflectivity of the light valve. For this reason, the conventional light valves can maintain the image only for a short moment. On the other hand, according to the present invention, the reflectivity of the light valve is set to either of the dark and bright states due to its bistability and clear threshold feature while not to intermediate states between the dark and bright states. The written image can be maintained permanently as long as an external voltage exceeding the threshold value or external physical stress is not applied to the light valve. For example, after writing the image onto the light valve, the light valve is cut from the bias voltage and left for three days. Thereafter, the contrast ratio of written image is measured to prove that the contrast is never changed and that the inventive light valve has excellent memory.

Figure 4:
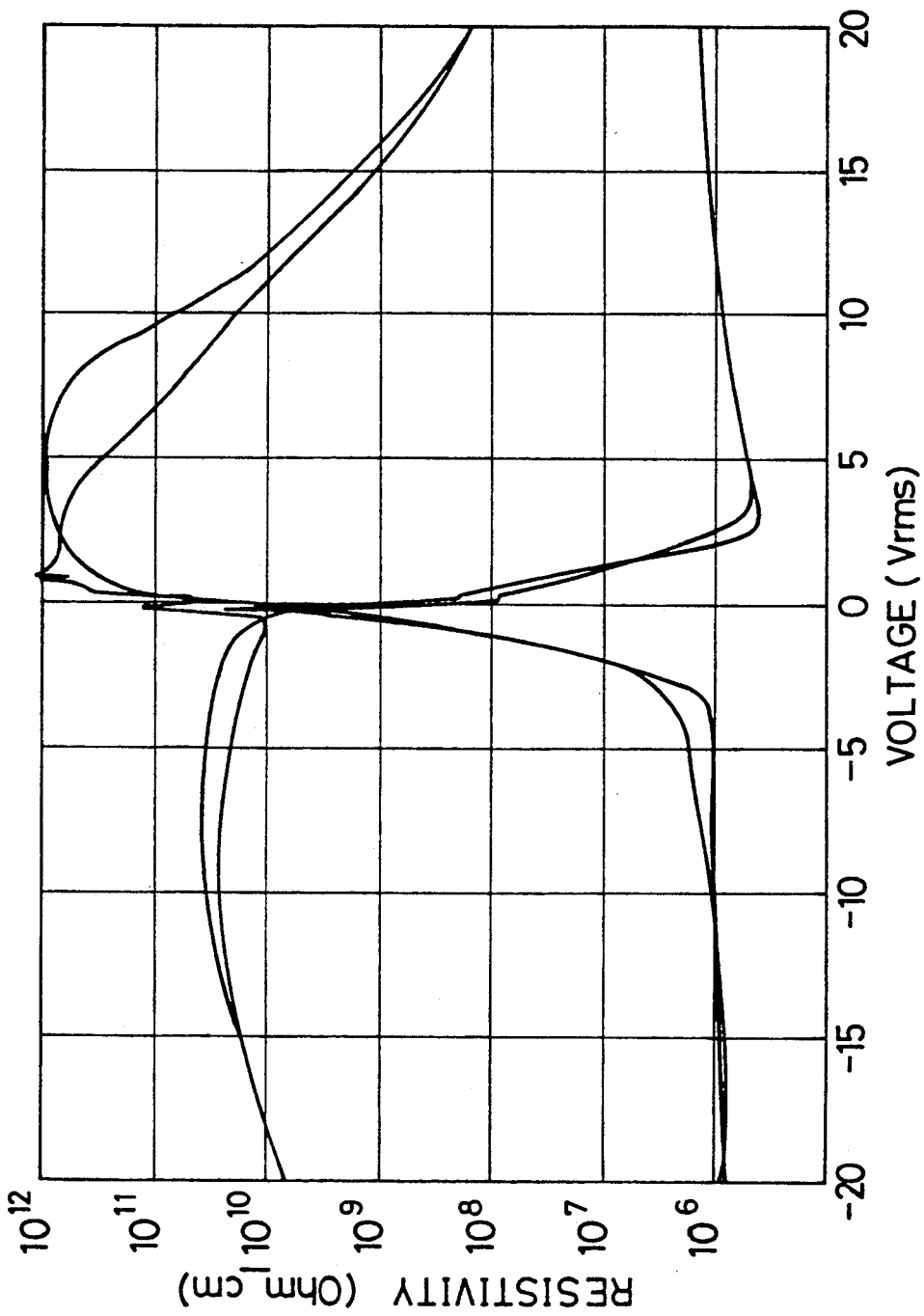
FIG. 4 is a diagram showing change of electric resistivity of photo-conductive film under dark and bright conditions, used in the inventive light valve.

FIG. 4 shows the changes of resistivity of photo-conductive layer composed of intrinsic a-Si:H having a thickness of 3 $\mu$m under the dark condition and bright condition with irradiation of incident light having a wavelength of 780 nm and a power of 40 mW. As apparent from the figure, the a-Si:H film exhibits great resistivity difference between the dark and bright conditions and therefore has excellent photo-sensitivity. Further, a-Si:H film has good thermal stability such that the a-Si:H film is not affected by heat which may be produced during the making of light valves. The a-Si:H film has a hard and smooth surface so that the dielectric mirror layer can be easily formed on the a-Si:H film flatly to thereby facilitate the spacing control of light valve cell.

The photo-conductive layer 15 can be formed in a multi-layer structure on the electrode layer 12a. For example, a p-type a-Si:H layer of 1000 Å thickness may be formed firstly on the electrode layer 12a by electric spark decomposition of $SiF_4$ gas added with 1000 ppm of $BH_3$ gas, and thereafter an intrinsic a-Si:H layer is deposited in similar manner as in the FIG. 1 embodiment to form the P-i type double layer. This type of light valve also can produce the projected image having clear and high contrast.

There are other multi-layer structures of photo-conductive film such as P-n double layer composed of non-doped n-type a-Si:H layer which does not contain any impurity and the p-type a-Si:H layer, or p-i-n triple layer composed of the above described p-i type double layer and third n-type a-Si:H layer deposited on the double layer by electric spark decomposition of $SiF_4$ gas containing $PH_3$ gas.

Further, another type of photo-conductive layer composed of Se or Se-Te can be utilized, but this type of photo-conductive layer does not have good thermal stability so that the photo-conductive layer tends to exhibit phase transition from the amorphous phase to the crystal phase during the fabrication of the light valve.

The alignment layer can be formed of other materials and by other methods than the oblique evaporation of SiO. For example, a liquid mixture solution of basic chromium complex compound effective to create homeotropic or vertical alignment of liquid crystal molecules and polyimide effective to create homogeneous or horizontal alignment of molecules is coated on the substrate and thermally cured. Thereafter, the coatings are rubbed to form the alignment layer effective to pre-tilt the ferroelectric liquid crystal molecules at a high tilt angle of 10° to 30°, which corresponds to a pre-tilt angle of 60 to 80 degrees to the normal to the plane of the liquid crystal layer.

The ferroelectric liquid crystal layer can be composed of a mixture composition of pyrimidine-derivative chiral smectic liquid crystal materials, or composed of a mixture composition of ester type chiral smectic liquid crystal materials and pyrimidine-derivative chiral smectic liquid crystal materials.

Figure 5:
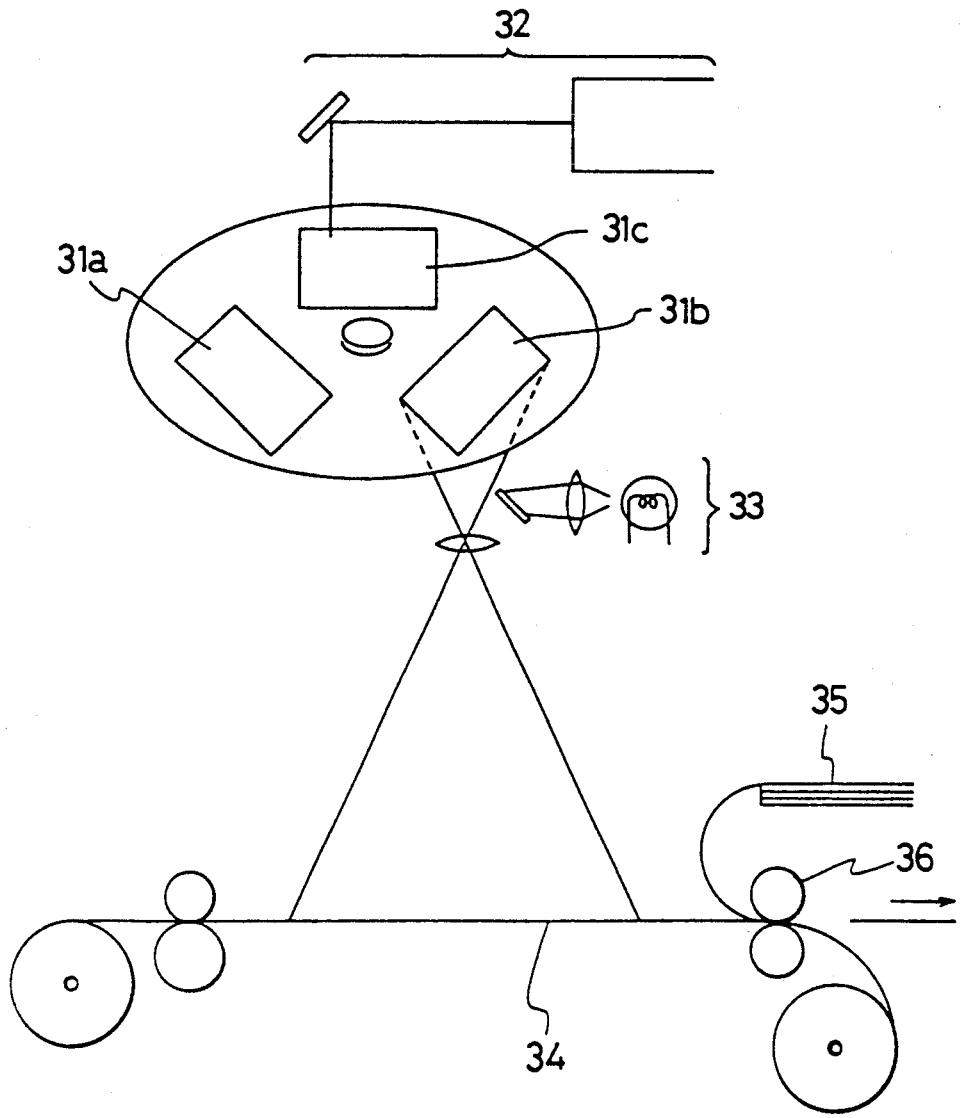
FIG. 5 is a schematic structural view of digital color laser printer applied with the inventive light valve.

Lastly, the various of applications the inventive light valve will be explained hereinbelow. FIG. 5 shows a schematic structural view of the digital color laser printer provided with the inventive liquid crystal light valves of the photo-electric conversion type. Three light valves 31a, 31b and 31c according to the present invention are disposed on a turntable. A laser scanner 35 scans a laser beam to write three color image components of red, green and blue color tones, respectively onto the corresponding three light valves 31a, 31b and 31c. Then a projecting optical system 33 irradiates the respective light valves 31a, 31b and 31c with three different wavelengths of lights, sequentially, which are produced by means of three color filters corresponding to the three primary colors of red, green and blue, to thereby project sequentially the three color image components on a medium 34.

Figure 6:
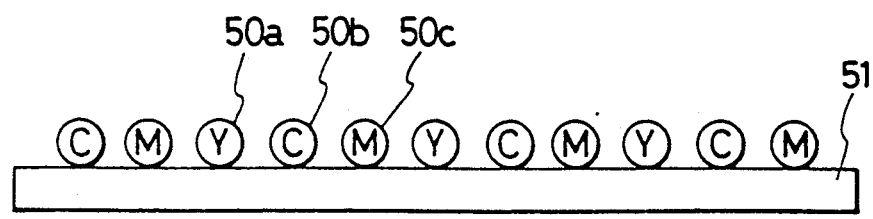
FIG. 6 is an enlarged sectional view of image medium used in the digital color laser printer of FIG. 5.

As shown in FIG. 6, the medium 34 is comprised of a base 51 dispersely coated with three different kinds of microcapsules 50a, 50b, 50c. The three kinds of microcapsules 50a, 50b and 50c are cured in response to the three different wavelengths of projecting lights, and contain therein three different leuco dyes of yellow Y, cyan C and magenta M, respectively. After selectively curing the microcapsules, the medium 34 is pressed by means of a roller 36 together with a receiver sheet 35 coated with color former to thereby develop the composite color image on the receiver sheet 35. By applying the inventive light valves to such digital color laser printer, the color image of high quality can be reproduced in a short processing time.

In addition, by arranging a screen in place of the medium 34 and by projecting the three color image components concurrently on the screen, a color projecter of high quality can be obtained.

Next, the inventive light valve can be used as an incoherent-coherent converter. In such a case, the light valve can be comprised of a photo-conductive layer composed of evaporated Cd film, Se amorphous film, Se-Te amorphous film, photo-conductive organic film or multi-layer film of separate function type, instead of the a-Si:H film. The incoherent-coherent converter of above described type is operated to form an image on the ferroelectric liquid crystal layer by the application of incoherent writing light from the rear side of converter cell. The written image is read out by means of a coherent reading light incident to the front side of converter cell. The coherent reading light is linearly polarized by a polarizer which has the polarization axis aligned in parallel to (or perpendicular to) the C director of liquid crystal molecules held in the preset state according to the presetting voltage which has an opposite polarity to that of the writing bias voltage applied during the writing operation, and the coherent reading light reflected from the dielectric mirror layer is analyzed by an analyzer which has a polarization axis aligned in perpendicular to (or parallel to) the polarization direction of a reflected reading light passing through the preset or erased region of liquid crystal layer.

Figure 7:
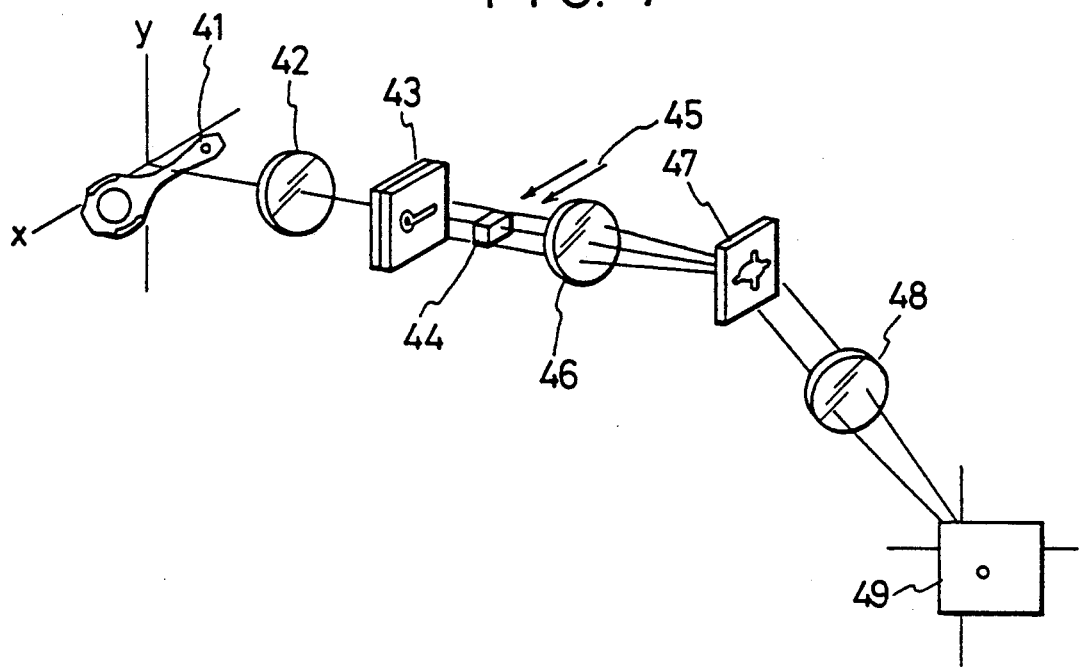
FIG. 7 is a schematic prospective view of optical information processing system applied with the inventive light valve.

FIG. 7 shows a perspective schematic view of an optical information processing system of coherent light correlation type provided with an incoherent-coherent converter of the inventive light valve. A reflected incoherent light from an object 41 to be measured is focused onto a light valve 43 of the present invention by means of a lens 42 to form an image of the object 41 on the light valve 43. In this case, since the inventive light valve has an effective image area larger than that of the non-linear optical crystal, even a large object can be measured. Further, since the inventive light valve has an optical response faster than that of the conventional light valves of TN or DSM mode, the image information can be processed with high speed close to real time response. The object image formed on the liquid crystal light valve 43 is irradiated with a coherent light 45 through a polarized light beam splitter 44 such that only the linearly polarized light component having the polarization axis aligned to the director of ferroelectric liquid crystal molecules held in the erased or preset state is actually directed to the light valve 43. The incident coherent and linearly polarized reading light 45 reflected through the portion of liquid crystal layer in which the director of molecules is reversed according to the selective irradiation of writing light is selectively modulated its polarization state due to the double refraction. The reflected light then reversely passes through the polarized light beam splitter 44 such that the part thereof modulated due to the double refraction is accordingly reduced in its intensity. Then the reflected light component is combined with the other polarized component of incident reading light 45 which is split away from the light valve 43 by the polarized light beam splitter 44, and is focused on a correlation coordinate surface 49 through a lens 46, a matched filter 47 and another lens 48 to thereby optically process the image information of object 41. In this application, by using the incoherent-coherent converter composed of the inventive light valve, even a large object can be optically processed at high speed close to the real time speed in the coherent light correlation system.

Next, a bistable memory device can be comprised of the inventive light valve cell. In this case, the photoconductive layer in the light valve cell is composed of a-Si:H film formed by the electric spark decomposition gas containing mainly of $SiF_4$. Otherwise, the photoconductive layer can be composed of p- or n-type a-Si:H film formed by electric spark decomposition of $SiF_4$ gas added with p- or n-type impurity gas, double layer structure of a-Si:H film and n- or p-type semiconductor film of different composition interposed between the a-Si:H film and the electrode layer, organic photoconductive film formed by a printing method, and evaporated photo-conductive film composed of Se or Se-Te.

In operation of reading the written data, a linearly polarized reading light passing through a polarizer having a polarization axis aligned in parallel to (or perpendicular to) the C director of liquid crystal molecules held in the preset state induced by the preset bias voltage having polarity opposite to that of the writing bias voltage is irradiated onto the light valve cell, and the reading polarized light reflected therefrom is analyzed by an analyzer having a polarization axis aligned perpendicular to (or parallel to) the polarization direction of reflected light from the preset or erased state of liquid crystal layer so as to measure the intensity of reflected reading light indicative of the written data.

Such type of memory cell comprised of the inventive light valve cell has memory data density depending on the spot size of the writing laser beam, hence its memory data density is comparable to that of a compact-disc ROM cell. Further, access speed thereof is very fast, the erase and rewriting of data can be repeatedly carried out, and the memory cell does not need any backup power source due to its optical bistability.

Figure 8:
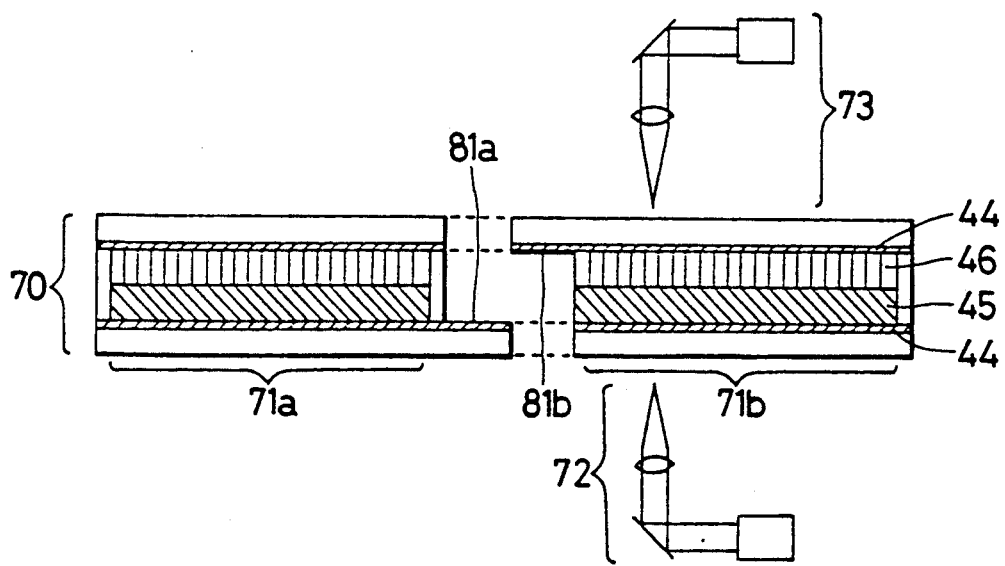
FIG. 8 is a schematic structural view of optical disc memory device applied with the inventive light valve.
Figure 9:
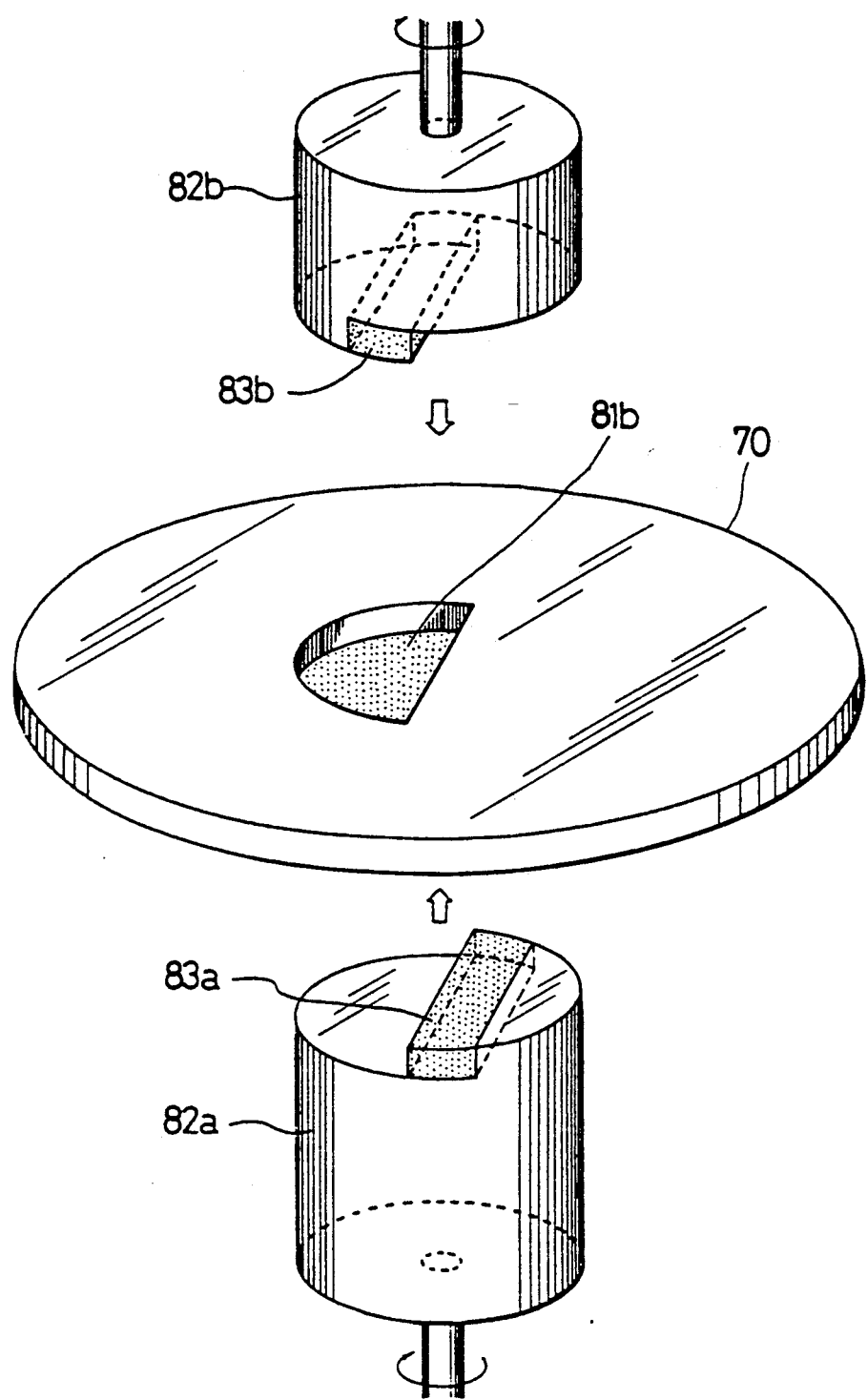
FIG. 9 is a perspective view showing the operation state of the optical disc memory device of FIG. 8.

FIG. 8 is a schematic diagram showing an optical disc memory device provided with an optical memory disc composed of the inventive light valve cell, and FIG. 9 is an enlarged view of central portion of the optical disc memory device shown in FIG. 8. As shown in FIG. 8, an optical memory disc 70 has a structure similar to that of the light valve cell shown in FIG. 1. Further, as similar the structure of conventional compact disc pick-up, a reading optical system 73 added with a pair of polarizer and analyzer is provided on the front side of memory disc 71 which is not arranged with a photoconductive layer 45 of the memory portions 71a and 71b of memory disc 71, and a writing optical system 72 utilizing a semiconductor laser is provided on the rear side of memory disc 71 which is arranged with the photo-conductive layer 45.

As shown in FIG. 9, a pair of electrode layers 44 are exposed at their contact portions 81a and 81b within a central opening of the disc 70. A pair of axially separated rotation shafts 82a and 82b make contact with the respective contact portions 81a and 81b at their respective electrode pads 83a and 83b arranged at opposed end portions of the respective shafts 82a and 82b so as to apply bias voltage across the pair of electrode layer 44 in the memory disc 70 during the rotation thereof. The respective optical systems 72 and 73 are scanned radially of the memory disc 70 to effect the writing and reading of data to and from the memory disc.

The optical memory cell according to the present invention can be formed in a card shape, and the writing operation can be effected by the scanning of laser beam with a polygon mirror or galvano mirror, or effected by means of LED array. Such type of an the optical memory device has also high data memory density and high access speed, and can effect repeatedly erasing and rewriting operation. Moreover, the device does not require any backup power supply due to its optical bistability.

As described above, according to the present invention, the light valve cell has great optical contrast, fast response speed effective to enable fast writing operation by means of laser beam, and high resolution. In view of these features, the inventive light valve can be used as an incoherent-coherent converter having a large effective area with fast processing, and as an optical memory having great S/N ratio, being addressable in a short period of time with laser a beam, being accessable at high speed with high memory data density, being operable to carry out erase and rewriting of data, and being driveable without, a backup power supply due to its optical bistability. Accordingly, the inventive light valve cell can be applicable for an intermediate recording medium of optical printer, image display device, optical shutter, coherent light correlation system and other image processing device so as to considerably improve the performance of these devices and to broaden the application field of these devices.

What is claimed is:

1. A liquid crystal device comprising; a liquid crystal layer having front and rear sides and being composed of liquid crystal molecules; front and rear alignment layers sandwiching the liquid crystal layer to impart thereto two stable states of different optical transmissivity or reflectivity, the alignment layers being effective to orient the molecules of the liquid crystal layer at a pre-tilt angle of 60 to 80 degrees to the normal to the plane of the liquid crystal layer; an optical reflecting layer adjacent the rear alignment layer; a photoconductive layer of hydrogenated amorphous silicon film adjacent the reflecting layer and having an electroconductivity which varies in dependence on incident light; a front electrode adjacent the front alignment layer; a rear electrode adjacent the photoconductive layer and cooperative with the front electrode for applying a bias voltage to effect switching of the liquid crystal layer between the two stable states; and front and rear transparent substrates adjacent the front and rear electrodes for receiving incident light.

2. A liquid crystal device comprising: a liquid crystal layer having front and rear sides and being composed of liquid crystal molecules; front and rear alignment layers sandwiching the liquid crystal layer to impart thereto two stable states of different optical transmissivity or reflectivity, the alignment layers having a molecular structure wherein the molecules are tilted at an angle of 75 to 85 degrees to the normal to the plane of the liquid crystal layer; an optical reflecting layer adjacent the rear alignment layer; a photoconductive layer of hydrogenated amorphous silicon film adjacent the reflecting layer and having an electroconductivity which varies in dependence on incident light; a front electrode adjacent the front alignment layer; a rear electrode adjacent the photoconductive layer and cooperative with the front electrode for applying a bias voltage to effect switching of the liquid crystal layer between the two stable states; and front and rear transparent substrates adjacent the front and rear electrodes for receiving incident light.

3. A device according to claim 1; wherein the liquid crystal layer is comprised of ferroelectric liquid crystal.

4. A method of storing data in a liquid crystal device having two stable states of different optical transmissivity or reflectivity, and front and rear surfaces receptive of incident light, the method comprising the steps of: presetting the liquid crystal device to one stable state by applying thereto a voltage greater than a first threshold value when incident light is applied and greater than a second threshold value which is greater than the first threshold value when no incident light is applied; writing data by applying to the liquid crystal device a voltage greater than the first threshold value and less than the second threshold value and a polarity opposite to that of the first and second threshold values; and irradiating the rear surface with light corresponding to the data to be stored.

5. A method according to claim 4; wherein the steps of applying voltage comprise applying a DC voltage.

6. A method according to claim 5; wherein the steps of applying a DC voltage include applying a DC voltage superposed with an AC voltage.

7. A method according to claim 4; further comprising reading out the stored data by irradiating the front surface and receiving the light reflected therefrom.

8. A method according to claim 4; wherein the liquid crystal device comprises a ferroelectric liquid crystal device.

* * * * *